United States Patent [19]

Kibblewhite et al.

[11] 4,316,512
[45] Feb. 23, 1982

[54] IMPACT WRENCH

[75] Inventors: Ian E. Kibblewhite, Dublin, Ireland; John T. Boys, Birkenhead, New Zealand; Angelo L. Tambini, Manor Kilbride, Ireland

[73] Assignee: SPS Technologies, Inc., Jenkintown, Pa.

[21] Appl. No.: 27,127

[22] Filed: Apr. 4, 1979

[51] Int. Cl.³ .......................................... B25B 23/147
[52] U.S. Cl. ...................................................... 173/12
[58] Field of Search .................. 173/12, 5, 1; 73/761, 73/139; 81/52.4 B, 52.5, 52.4 R

[56] References Cited

U.S. PATENT DOCUMENTS

| | | | |
|---|---|---|---|
| 4,008,772 | 2/1977 | Boys | 173/12 |
| 4,104,778 | 8/1978 | Vliet | 173/12 X |
| 4,106,176 | 8/1978 | Rice et al. | 173/12 X |

OTHER PUBLICATIONS

Kibblewhite, "Impact Phenomena with Screw Fasteners", 1976, pp. 41–53, University of Canterbury Engineering Library, Christchurch, New Zealand.

Primary Examiner—Peter P. Nerbun
Attorney, Agent, or Firm—Aaron Nerenberg

[57] ABSTRACT

A self-contained impact wrench having an adaptive control system for determining the yield point or some similarly significant tightened condition of a fastener assembly by detecting a signal representative of the forward rotation angle of the fastener assembly is disclosed. One embodiment utilizes a computed signal of time over a fixed interval of forward rotation angle, as an estimate of the torque applied by the impact wrench, and the torque estimate vs. rotation angle curve is differentiated to obtain the gradient thereof. Successive gradient values are stored and compared, and when the present gradient value has attained a predetermined relationship relative to a stored value of a gradient in a tightening region of the curve, further tightening of the fastener assembly is discontinued. This ensures that the yield point or other similarly significant tightened condition of the assembly has been reached.

77 Claims, 17 Drawing Figures

IMPACT WRENCH

BACKGROUND OF THE INVENTION

This invention relates generally to the field of tool driving or impacting, and more particularly to a self-contained impact type wrench having a control system for accurately controlling the tension in a fastener assembly of a joint.

It is well known in the prior art that tightening a fastener to its yield point produces optimum joint efficiency. A fastened joint having a greater preload value up to the yield point of the material of the joint is more reliable and ensures better fastener performance. High fastener preload further increases fatigue resistance due to the fastener feeling less added stress from external joint loading, and dynamically loaded joints have less tendency to slip and loosen.

The prior art reveals various types of impact wrench control systems for controlling the amount of preload in a fastener. One commonly used type employs some form of torque control, in which the impact wrench tightenes a fastener to a maximum predetermined value of torque and thereupon shuts off. Examples of impact wrenches utilizing torque control can be found in United States Patents to Schoeps et al, U.S. Pat. No. 3,835,934; Hall U.S. Pat. No. 3,833,068; Schoeps, U.S. Pat. No. 3,703,933; Vaughn, U.S. Pat. No. 3,174,559; Elliott et al, U.S. Pat. No. 3,018,866 and Maurer, U.S. Pat. No. 2,543,979. Another means of controlling impact wrenches found in the prior art is commonly known as a "turn-of-the-nut" system, in which a fastener is tightened to some preselected initial condition, such as a predetermined torque value or spindle speed, and thereupon rotated an additional predetermined number of degrees before shutting off. Examples of various turn-of-the-nut impact wrench systems are found in United States Patents to Allen, U.S. Pat. No. 3,623,557; Hoza et al, U.S. Pat. No. 3,318,390 and Spyradakis et al, U.S. Pat. No. 3,011,479. Another type of control comprises imparting a constant angular momentum of each impulse blow, such as found in the United States Patent to Swanson, U.S. Pat. No. 3,181,672.

In all of the control systems described in the above-noted patents, prior knowledge of the fastener and joint characteristics must be known or assumed in order to determine either the exact predetermined final torque, the exact amount of additional rotation, or the amount of constant angular momentum of each impact blow. It is well known that tightening to a predetermined preload condition, such as the yield point, is a function of many variables, among them being joint stiffness, fastener stiffness, surface friction between mating threads and thread form of the mating threads. Therefore, if it is desired to tighten an assembly to the yield point with any of the systems described in the above-noted prior art patents, this point cannot always be accurately determined because the conditions of each fastener assembly and joint can vary and may not be known in advance. This consequence can lead to uneven tightening from joint to joint in the same structure, which, in turn, can result in loosening of one or more fastener assemblies, especially in the presence of vibrations, and premature fatigue failure.

In the control system described in co-pending application, Ser. No. 818,511, which is a continuation of co-pending application No. 579,110 now abandoned, the yield point of a fastener assembly is attained by a tightening apparatus which periodically applies a tightening moment to the fastener assembly, such as, for example, an impact wrench. The yield point is attained when an instantaneous peak moment signal has not increased by more than a predetermined amount over a stored previous peak moment signal. While this control system works satisfactorily in certain applications, the present invention is seen as being an improvement thereover.

SUMMARY OF THE INVENTION

Accordingly, it is a general purpose and object of the present invention to provide apparatus for tightening a fastener assembly to the yield point or some similarly significant tightened condition in a joint. It is another object of the present invention to provide a control system for tightening a fastener assembly to its yield point, which control system is particularly useful in a tightening system having a pulsed output for periodically applying a tightening moment. It is still another object of the present invention to provide an impact wrench having a self-contained, adaptive control system for accurately tightening a fastener assembly to a predetermined preload condition by the utilization of measured characteristics of the fastener assembly and joint being tightened. It is yet a further object of the present invention to provide an adaptive control system in an impact wrench for accurately tightening a fastener to a predetermined preload condition with minimum prior knowledge of the fastener assembly and joint characteristics. It is yet another object of the present invention to provide an impact wrench having an adaptive control system which determines the yield point or similarly significant tightened condition by measuring a value representative of the forward rotation angle of the fastener assembly being tightened, and utilizes a computed function of this forward rotation angle to determine the yield point. It is still a further object of the present invention to provide an impact wrench having an adaptive control system which determines the yield point or similarly significant tightened condition of a member by utilizing a measurement of time over a fixed interval of forward rotation angle as a parameter representative of the torque applied to the member, and thereafter applies gradient comparison techniques to a curve of the parameter representative of torque vs. forward rotation angle to obtain the yield point. Finally, it is an object of the present invention to provide an integral, self-contained impact wrench/control system which is compact, reliable, relatively inexpensive to manufacture and easily maintainable.

These and other objects are accomplished according to the present invention by apparatus for providing a parameter representative of torque in a tightening system having a pulsed output for periodically applying a tightening moment to a member, the parameter being derived from forward rotation angle measurement of the member being tightened.

BRIEF DESCRIPTION OF THE DRAWINGS

FIG. 6c is an illustration of the waveforms produced by the circuit of FIG. 6a;

DESCRIPTION OF THE PREFERRED EMBODIMENT

Before preceeding with a description of an apparatus and control system in accordance with the present invention, a brief discussion about the operation of impact wrenches will be presented. All impact wrenches operate by releasing a periodic build up of kinetic energy in the form of a series of torsional shock impulses transmitted to a fastener assembly, which may typically include a bolt and/or nut. As a result, considerable impact forces can be produced with little reactive torque. Pneumatically drive impact wrenches are most common (as compared with electrically or hydraulically driven impact wrenches) and comprise a vane type air motor and a hammer/anvil mechanism. When the air motor gains sufficient speed, a high inertia hammer on the motor shaft engages on an anvil on the wrench drive shaft. The energy of the blow is (a) dissipated as a result of collision inelasticity and friction; (b) stored as torsional strain energy in the impact mechanism, the wrench drive shaft and the coupling to the fastener; and (c) transferred to the fastener, and converted to the work of tightening. The hammer than disengages from the anvil and the motor accelerates for a complete revolution before delivering the next blow. While most impact wrenches deliver one blow per revolution, there are some which can deliver more than one blow per revolution of the motor. The above description is for conventional pneumatically driven impact wrenches.

Unlike a continuous action power wrench system in which the torque applied can be measured with a strain gauged reaction torque transducer, there is no convenient way to directly measure the torque applied by an impact wrench. Consequently, it is difficult to control tightening accurately with these wrenches. Because of the discontinuity of impact wrench dynamics which prevents continuous parameter measurement, control of impact wrench tightening has relied largely on limiting the energy transmitted to the fastener rather than the measurement of impact parameters for estimating applied torque. It has been found that a beneficial parameter for use as an estimate of torque in an impact wrench is based upon measurement of the forward rotation angle of the fastener assembly. The following three assumptions are made in deriving the torque estimate: (a) constant energy is transmitted by the impact mechanism (i.e. the air motor reaches full speed well before impact occurs); (b) the torsional strain energy in the shafts and couplings is small; and (c) the time between impacts is approximately constant. Therefore, the energy (E) transmitted to the wrench anvil on each impact is converted to the work done in rotating the bolt head through angle ($\Delta\phi$) against average torque (T). Then, $$E = T\Delta\phi.$$

Since E is assumed to be constant, $$T \alpha \frac{1}{\Delta\phi}$$

That is, the average torque applied to the bolt during an impact is inversely proportional to the angle through which it is rotated. Measurement of the bolt rotation angle per impact is possible but difficult in practice because of the difficulty in making high resolution encoders necessary to detect the relatively small values of $\Delta\phi$ (i.e. 2°-3° at final tightening torques), and the difficulty in determining when an impact has occurred. In further explanation of the latter point, it can be difficult to discriminate between actual rotations resulting from impacts and apparent rotations due to slight movements of the hand-held impact wrench during tightening. Since the time between impacts is assumed to be constant, the average applied torque will also be inversely proportional to the average rate of tightening. This can be expressed as $$\text{Average Torque } \alpha \frac{1}{\frac{\text{Rotation Angle}}{\text{Time}}}$$

or, $$\text{Average Torque } \alpha \frac{\text{Time}}{\text{Rotation Angle}}$$

By measuring time over a fixed interval of angle, the need for high resolution encoders and determining when an impact has occurred is eliminated.

Referring now to FIGS. 1, 2, 3, 4a, 4b, 4c and 4d of the drawings, there is illustrated a preferred embodiment of an impact wrench in accordance with the present invention. While the invention will be described with reference to an impact wrench, it should be understood that the invention may be practiced in any tightening system having a pulsed output for periodically applying a tightening moment to a member. Wrench 10 may be any conventional, pneumatically powered impact wrench designed to receive compressed air from an external source (not shown) in order to successively impact a hammer assembly 12 onto an anvil 14. The anvil is rotatably secured within the forward portion of a wrench housing 16 by a bearing 18. The forward end 20 of anvil 14 comprises, for example, a square drive for attachment to a drive socket (not shown) or some other suitably shaped wrenching member for driving a fastener assembly (not shown). Hammer assembly 12, which is connected to and driven by a conventional air motor rotor 22, surrounds and contacts portions of anvil 14 imparting periodic impact blows thereto to rotate the anvil and drive the fastener assembly. Wrench 10 also includes a conventional trigger mechanism 24 which, when depressed, allows air from the external source (not shown) to enter the wrench at an inlet port 26 connected to the air motor, driving rotor 22 coupled to hammer assembly 12 which rotates anvil 14.

A bidirectional incremental encoder 28 used in a system for measuring angular rotation of the fastener assembly is mounted on a shaft 30 within the wrench, suitably fixed to anvil 14 for rotation therewith. The encoder disc is of a low inertia type which eliminates problems of fixing the encoder to the shaft in order to withstand the high shock loadings at impact. The low inertia disc also avoids errors in measuring angular rotation due to twisting of the shaft on which it is mounted during the large accelerations encountered during operation. While the encoder is illustrated as being located toward the rear portion of the wrench body, it should be understood that it may be located at any convenient place within the wrench. Since anvil 14 drives the wrenching member which tightens the fastener assembly, encoder 28 essentially rotates with the fastener assembly as it is tightened in a joint. Between impacts of hammer 12 against anvil 14, the anvil and encoder coupled thereto recoil, but the fastener assembly does not due to tolerances in the connection between the driving member and the fastener assembly. Thus the rotation measuring system should be capable of detecting and disregarding any recoil of encoder 28. Encoder 28 includes a series of vanes or teeth 32 on its outer periphery, with the present embodiment including eighteen (18) teeth having their respective center lines spaced 20° apart. However, it should be noted that the encoder could contain more or less teeth depending on the degree of accuracy desired, the only requirement being that the teeth are spaced equally apart from each other. A pair of light emitting diodes (LED's) 34 (only one is visible in FIG. 1) are mounted on a board 36 suitably fixed to the wrench housing directly across from a pair of photo transistors 38 mounted on a board 40 which is coupled to board 26 by means of a pair of electrically conducting spacers 42. The LED's 34 and corresponding photo transistors or sensors 38 are mounted at an angular spacing of 45° in the present embodiment providing angle resolution of 5°, but they could be spaced any odd multiple of the encoder resolution degrees (i.e. 5°, 15°, 25°, 35°, 45°, 55° etc.). Seventy-two (72) counts per revolution of the encoder are produced with this configuration. While optical angle sensing devices have been disclosed in the present embodiment, it is here noted that any other suitable proximity type sensing devices may be used instead to detect the passage of teeth 32 during operation of the wrench. These include, among other types, magnetic sensors which have an induction coil whose output varies due to the presence or absence of metal.

The impact wrench control system electronics is contained completely within the wrench housing in the back portion thereof. The control system is powered by a battery 44 which is accessible by removing a cap 46. Preferably, but not necessarily, a 280 mA-hr nickel-cadmium eight cell battery, having a nominal voltage of 10 volts, is used. The battery is supported at each end by a pair of stiff springs 48, so that a good electrical contact is maintained during the severe vibration from the impacting action of the wrench. A pair of connectors 50 transmit power from battery 44 to boards 36 and 40, containing the angle measurement devices, as well as to the remainder of the electronic control system. The electronics are contained on three boards 52 rigidly bolted together and mounted at the back of the wrench, which boards are accessible by removing cover 54 and are insulated from shock and vibration by any suitable shock absorbing material 56. The remaining portion of the operating control system consists of an air/solenoid trip valve assembly 58, which will be described in detail hereinbelow. The solenoid receives power directly from battery 44.

Mounted on one side of trigger 24 is a permanent magnet 60, and on the inside of the handle 62 housing is a reed switch 64. Upon depressing trigger 24, in addition to allowing air to pass to the air motor, reed switch 64 is closed by the magnet in order to direct power to the control system, as will also be described in detail hereinbelow.

Six six indicator LED's comprising LED display 66 are mounted on top of the wrench housing and also receive their power from battery 44. These LED's are color coded and indicate to the operator the wrench/tightening condition and certain fault conditions. A RUN LED (orange) indicates that the system is operating, and comes on almost immediately after trigger 24 is depressed and OK LED (green) indicates that the tightening of the joint is complete and within preselected specifications; and ANGLE LOW LED (red) indicates that a yield point has been detected, but a minimum preselected angle value after reaching a snug point has not been attained; an ANGLE HIGH LED (red) indicates that a maximum preselected angle value after reaching a snug point has been exceeded without detecting a yield point (these three lights are part of a quality control system described more fully in U.S. Pat. No. 3,973,434, but do not control the operation of the wrench). A TIGHTENING RATE SLOW LED (red) indicates that the wrench does not have sufficient power to yield the bolt (i.e. the bolt has either stopped rotating or else is rotating too slowly for the control system to operate). Finally, a BATTERY LOW LED (red) indicates that the battery needs recharging if the battery voltage level is low when the trigger is depressed.

Referring to FIGS. 4a, 4b, 4c and 4d, a unique air/solenoid trip valve assembly 58 is shown. This valve assembly must be capable of shutting off the flow of air from the air source to the wrench air motor very rapidly when the control system produces a signal indicating that tightening is complete, and must also require a minimum amount of power to operate. Valve assembly 58 includes an electrically actuated solenoid valve 300, an air valve 302 and a trip lever 304 biased by a return spring 306 into engagement with a plunger 308 in the air valve to keep the valve in an open position. A spring 310 within the air valve housing 312 biases the plunger to a normally open position. Trip lever 304 is actuated by a plunger 314 in the solenoid valve.

Figures 4A, 4B:
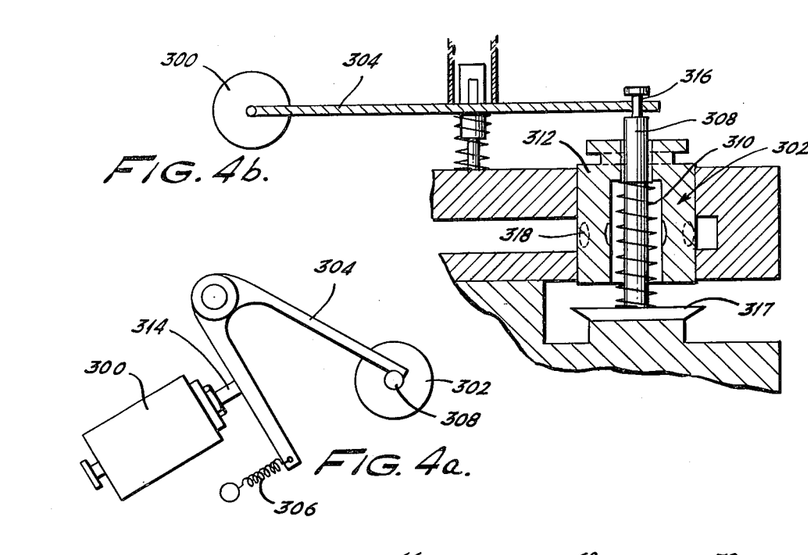
FIGS. 4a-4d are views of the air/solenoid trip valve assembly shown in FIGS. 1 and 2, in elevation and partially in cross-section showing progressive operation of the assembly.
Figure 4C:
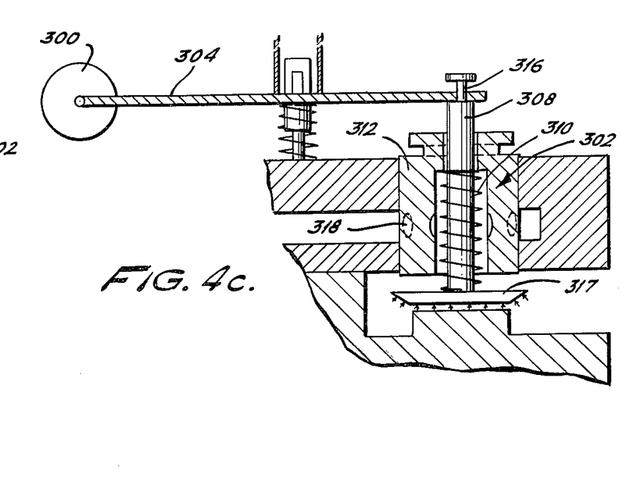
Figure 4D:
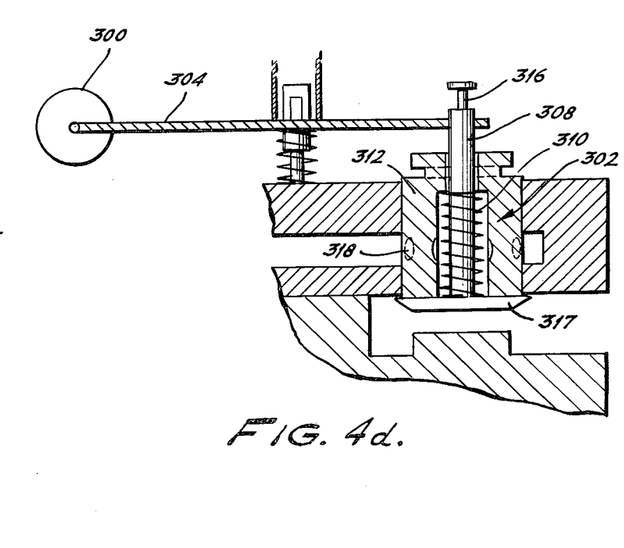

As previously mentioned, before operation of the wrench, as illustrated in FIG. 4b, trip lever 304 engages a cutout 316 on air valve plunger 308 keeping the plunger in an open position aided by the force of spring 310. Plunger 308 also includes an enlarged head portion 317 at its other end. When trigger mechanism 24 is depressed, air flows from inlet port 26 through an outlet port 318 of air valve 302 to the air motor operating the impact wrench. As can best be seen in FIG. 4c, the pressure exerted by the air flowing through air valve 302 causes an upward force against the surface of enlarged head 317 moving plunger 308 upwardly against spring 310 and trip lever 304. This air pressure is designed to produce a greater force on the plunger in an upward direction than the downward force exerted by spring 310. When an electrical signal is produced by the control system indicating that tightening is complete, such as at the yield point of the fastener assembly being tightened, this signal actuates solenoid valve 300, causing plunger 314 to rotate trip lever 304 out of engagement with air valve plunger 308. This occurs very rapidly, and once the solenoid valve is pulsed to actuate it, the electrical signal can be removed eliminating any further power drain from the battery. Since trigger mechanism 24 is still being depressed by the wrench operator, causing air to flow into air valve 302, the pressure exerted by the air overcomes the force of spring 310 and forces plunger 308 upwardly against valve body 312 cutting off flow through the air valve to the wrench air motor, as shown in FIG. 4d. It should be noted that there is a differential pressure across the air valve from the inlet to the outlet port due to air flow, allowing rapid closure of the valve. At this point, the operator recognizes that tightening has been completed, and he releases trigger mechanism 24 cutting off further air flow. Plunger 308 thereupon is forced downwardly to an open position by spring 310, and return spring 306 rotates trip lever 304 back into engagement with cutout 316 keeping it open and ready for the next tightening sequence, as illustrated in FIG. 4b.

Figure 5:
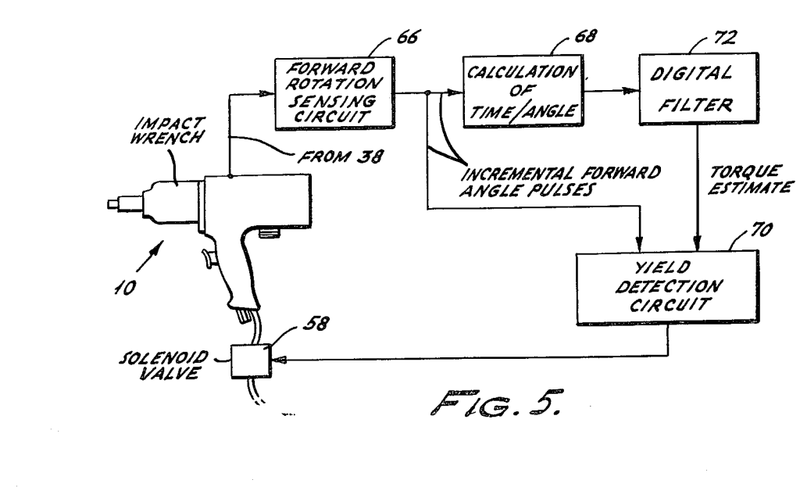
FIG. 5 is a schematic block diagram of the control system for the wrench shown in FIG. 1.
Figure 7:
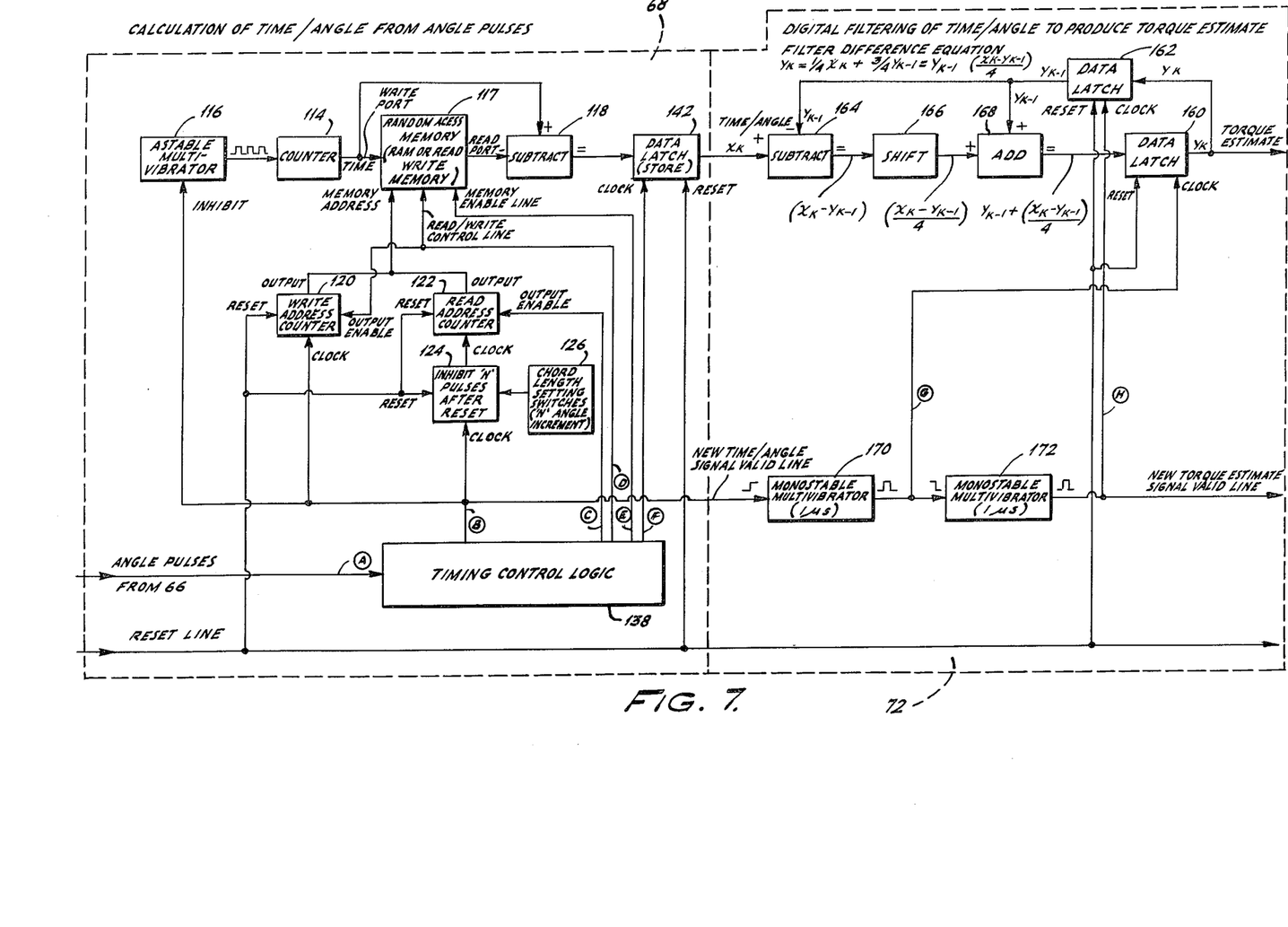
FIG. 7 is a schematic block diagram of the Calculation of Time/Angle and Digital Filter blocks shown in FIG. 5.
Figure 8:
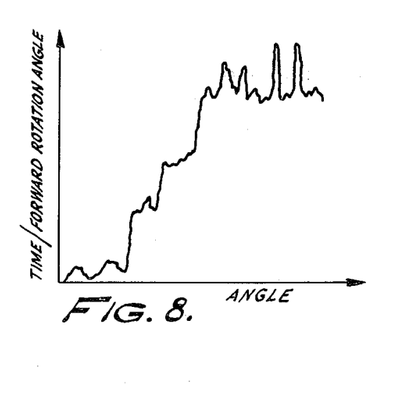
FIG. 8 is a graph of the parameters TIME/FORWARD ROTATION ANGLE vs. ANGLE from the Calculation of Time/Angle block of FIGS. 5 and 7 before filtering.

Referring now to FIG. 5, a control system is illustrated for controlling the tightening of a fastener assembly by wrench 10. It should be clear from all of the foregoing that the entire control system is within the housing or wrench 10, which control system is illustrated as separate blocks outside of the wrench in FIG. 5 for convenience. Signals from photo transistors 38 are supplied to a forward rotation sensing circuit 66 in quadrature, as will be explained more fully below with regard to FIG. 6a, 6b and 6c. Circuit 66 produces angle pulses representing increments of forward angular displacement of the wrench output shaft 20 or the rotation angle of the fastener assembly being tightened. These incremental forward angle pulses are introduced into a circuit 68 for calculation of time per forward rotation angle and a circuit 70 for detecting the yield point of the assembly being tightened. Circuit 68 is illustrated in FIG. 7 and will be described below. The output signals from circuit 68 can be used to generate a curve as illustrated in FIG. 8, which can be seen to contain a high noise level due to the discontinuities in the impact tightening process, and is generally unsatisfactory for use without further processing. Consequently, this curve is then filtered in the angle domain in a digital filter 72 to produce the smoother curve illustrated in FIG. 9. The information from this curve is used in yield detection circuit 70, which will be discussed hereinbelow. Once the yield point is detected by circuit 70, a signal is fed back to solenoid trip valve assembly 58 to cut off the flow of air to the air motor and stop tightening, as previously described with reference to FIGS. 4a–4d.

Forward rotation sensing circuit 66 will now be described in detail with regard to FIG. 6a. As previously stated, the purpose of this circuit is to produce pulses representing increments of forward rotation angle of the fastener during tightening. The reference for the angle measurements is the hand held impact wrench. Angular movement of the wrench by the operator during tightening is generally significantly less than the encoder resolution or the required accuracy for control system operation. The impact wrench drive shaft rotation angle is representative of the fastener rotation angle only for the duration of the impact. At all other times the angle measurement of the drive shaft is subject to errors due to recoil and backlash in the couplings between the drive shaft and the fastener assembly after an impact. Hence the maximum forward angular displacement of the drive shaft represents the forward rotation angle of the fastener assembly which is required.

Figure 6A:
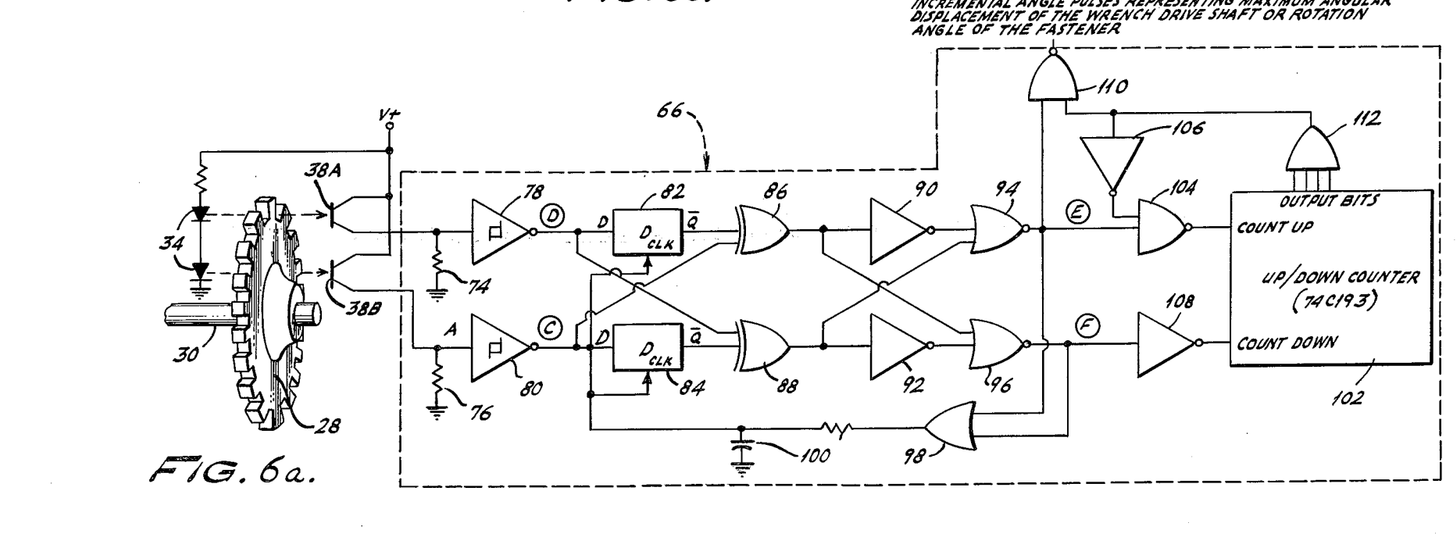
FIG. 6a is a schematic illustration of the Forward Rotation Sensing Circuit shown in FIG. 5.
Figure 6B:
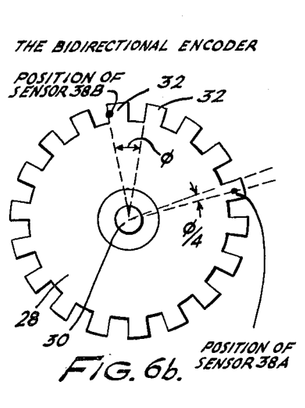
FIG. 6b is an elevational view of the encoder and sensors shown in FIGS. 1, 2 and 6a showing resolution of the forward rotation sensing system.
Figure 6C:
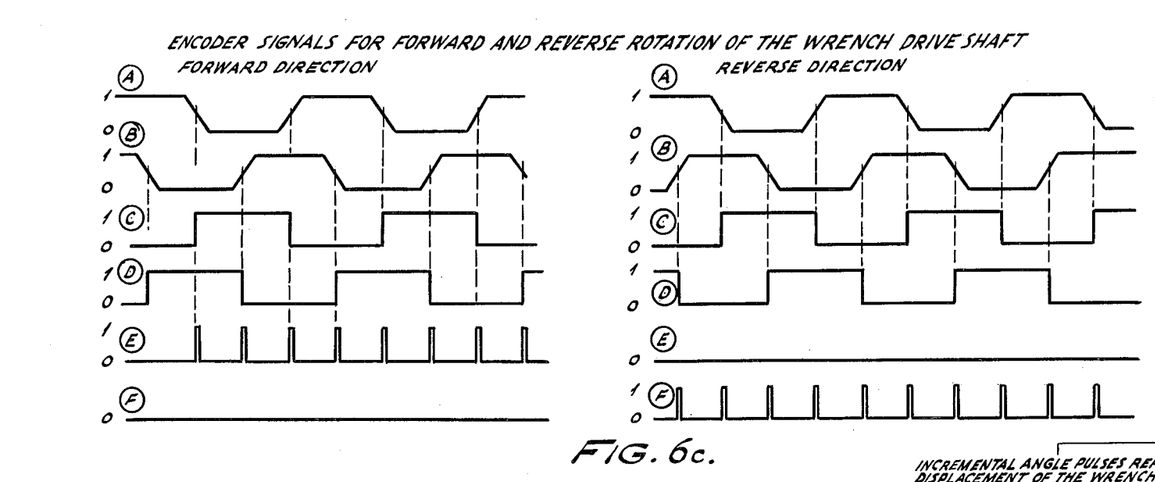

Referring to FIGS. 6a, 6b, and 6c, encoder 28 and sensors 38A and 38B are illustrated with the actual spacing between the sensors shown. This arrangement, having a resolution of $\phi/4$ or 5°, produces signals A and B shown in FIG. 6c for either forward or reverse rotation of the encoder. The signals from sensors 38A and 38B are fed through grounded resistors 74 and 76, respectively, to a pair of Schmitt triggers 78 and 80, respectively. The Schmitt triggers are used to produce signals C and D with clearly defined transitions from the sensor signals A and B. Two D-type latches 82 and 84 receive and temporarily store the previous signal levels from Schmitt triggers 78 and 80, respectively. The output of latches 82 and 84 are introduced into one input of exclusive OR gates 86 and 88, respectively. The second input to gate 86 is from Schmitt trigger 80, and the second input to gate 88 is from Schmitt trigger 78. The outputs from gates 86 and 88 are introduced into inverters 90 and 92, respectively, and into one input to NOR gates 96 and 94, respectively. The other inputs to gates 94 and 96 are from inverters 90 and 92, respectively. The signals stored in latches 82 and 84 are thus compared with the incoming signals C and D to latches 84 and 82, respectively, causing the signals E or F from NOR gates 94 and 96, respectively, to change from a logical 0 to 1 for an increment in the forward or reverse direction, respectively. These signal level changes are then used to clock latches 82 and 84 so that they then store the present signal levels from Schmitt triggers 78 and 80, respectively, and are ready for the next signal change from the encoder. When latches 82 and 84 are clocked, the signal level at E or F changes back to a logical 0. The pulse length of signals E and F is determined by the delay in clocking the latches, and is controlled by introducing the output signals from NOR gates 94 and 96 into the inputs of an OR gate 98, whose output is fed to latches 82 and 84 through a grounded resistor/capacitor circuit 100 which provides the appropriate time constant.

An UP/DOWN counter 102, such as a National Semiconductor part No. 74C193, is used to store the maximum forward angular displacement signals. Forward direction signals E are introduced into the Count Up input of counter 102 through a NAND gate 104 which receives another input from an inverter 106. Reverse direction signals F are introduced into the Count Down input of counter 102 through an inverter 108. During an impact, the forward angle pulses E are fed to the output G of circuit 66 through a NAND gate 110, which receives another input from a four input AND gate 112. The four inputs to AND gate 112 are the binary output bits from counter 102. The counter output bits are all logical 1's, and the forward angle pulses to the counter are inhibited when pulses representing reverse rotation of the drive shaft are produced between impacts due to recoil and backlash in the wrench. These reverse pulses F are subtracted from the preset count stored in counter 102, and thus one or more of the output bit signals to AND gate 112 then become logical 0's, causing the output from gate 112 which is fed to NAND gate 110, to become 0. NAND gate 110 cannot output any further forward rotation pulses E until the reverse pulses F are made up in counter 102. At the next impact, forward rotation pulses E are once again introduced into the Count Up input of counter 102, and when the reverse pulses are made up, the counter output bits once again become logical 1's allowing AND gate 112 to output a high signal to NAND gate 110 (and inverter 106). Gate 110 then allows forward rotation signals E to pass to the output G of circuit 66, and inverter 106 inhibits the introduction of signals E through gate 104 to counter 102. In this way the counter stores the angular position of encoder 28 before any rotation in the reverse direction and inhibits all forward angle pulses until the encoder has returned to that position.

Referring now to FIG. 7, the circuit for calculating the time per forward rotation angle will be explained. At each angle increment signal from circuit 66, the time is calculated for the bolt to rotate through the previous "n" angle increments (where "n" = preset chord length, such as, for example (4) increments of 5° per increment or 20°). Time is measured by a counter 114 driven by a simple astable multivibrator circuit 116. Counter 114 may be typically made up of three 4-bit counters, such as, for example, National Semiconductor part No. 7493, for 12-bit resolution, and multivibrator 116 is a squarewave signal generator, such as, for example, National Semiconductor part No. 555. This time is stored at each angle increment in a read-write random excess memory (RAM) unit 117, which typically may consist of three 16×4-bit RAMS for 12-bit resolution such as, for example, National Semiconductor part No. 7489. The time to rotate the bolt through a value of "n" increments (equal to the preselected chord length) is calculated by reading from RAM 117 the value of time which was stored "n" angle increments previously, and subtracting this value of time from the value just stored in a subtraction circuit 118. The value of the output signal from subtraction circuit 118 is the time/angle signal illustrated in FIG. 8, which could be plotted, if desired, for the joint being tightened. Memory addressing of RAM 117 is accomplished by the outputs from two tri-state address counters 120 and 122. These address counters are typically 4-bit counters with three state outputs, such as, for example, National Semiconductor part No. 8554. The output of read address counter 122 is equal to the output of write address counter less the chord length preset with switches in binary as a particular number of angle increments. During normal processing, both of these address counters are clocked, incrementing their addresses by "1" every angle increment. Counters 120 and 122 are initially preset by resetting them to "0" and then inhibiting the first "N" clock pulses to read address counter 122 by means of circuits 124, which will now be described in greater detail with regard to FIG. 7a.

Figure 7A:
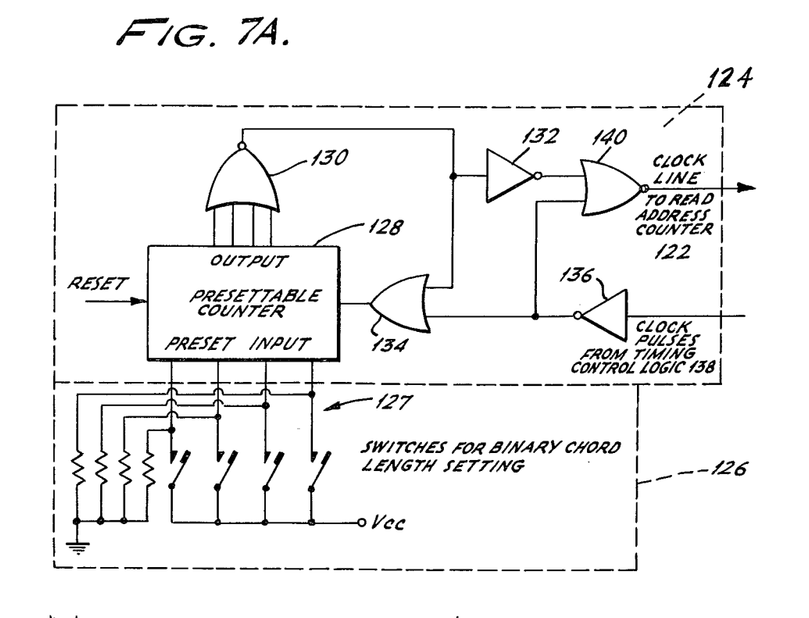
FIG. 7a is a schematic illustration of the Inhibit "N" Pulses After Reset and Chord Length Setting blocks shown in FIG. 7.

Circuit 124 includes a presettable counter 128, such as, for example, National Semiconductor part No. 74197, and a series of logic gates to inhibit the number of read address counter 122 clock pulses preset by the chord length switches in circuit 126 after reset. The number in read address counter 122 therefore becomes the number in write address counter 120 minus the preset chord length. Counter 128 receives a reset signal from the reset line and a series of preset chord length inputs from binary switches 127 in circuit 126. The output from counter 128 is fed into a 4-input NOR gate 130 whose output is fed into an inverter 132 and one input of an OR gate 134. The other input to OR gate 134 is from the output of an inverter 136 which receives clock pulses from a timing control logic circuit 138. The outputs of inverters 132 and 136 are fed into a NOR gate 140 whose output clocks read address counter 122, as previously described. The chord length is set in "1's" complement by switches 127 (inverted logic signals), and pulses are enabled to presettable counter 128 and inhibited to read address counter 122 until presettable counter 128 output reaches "0000".

Figure 7B:
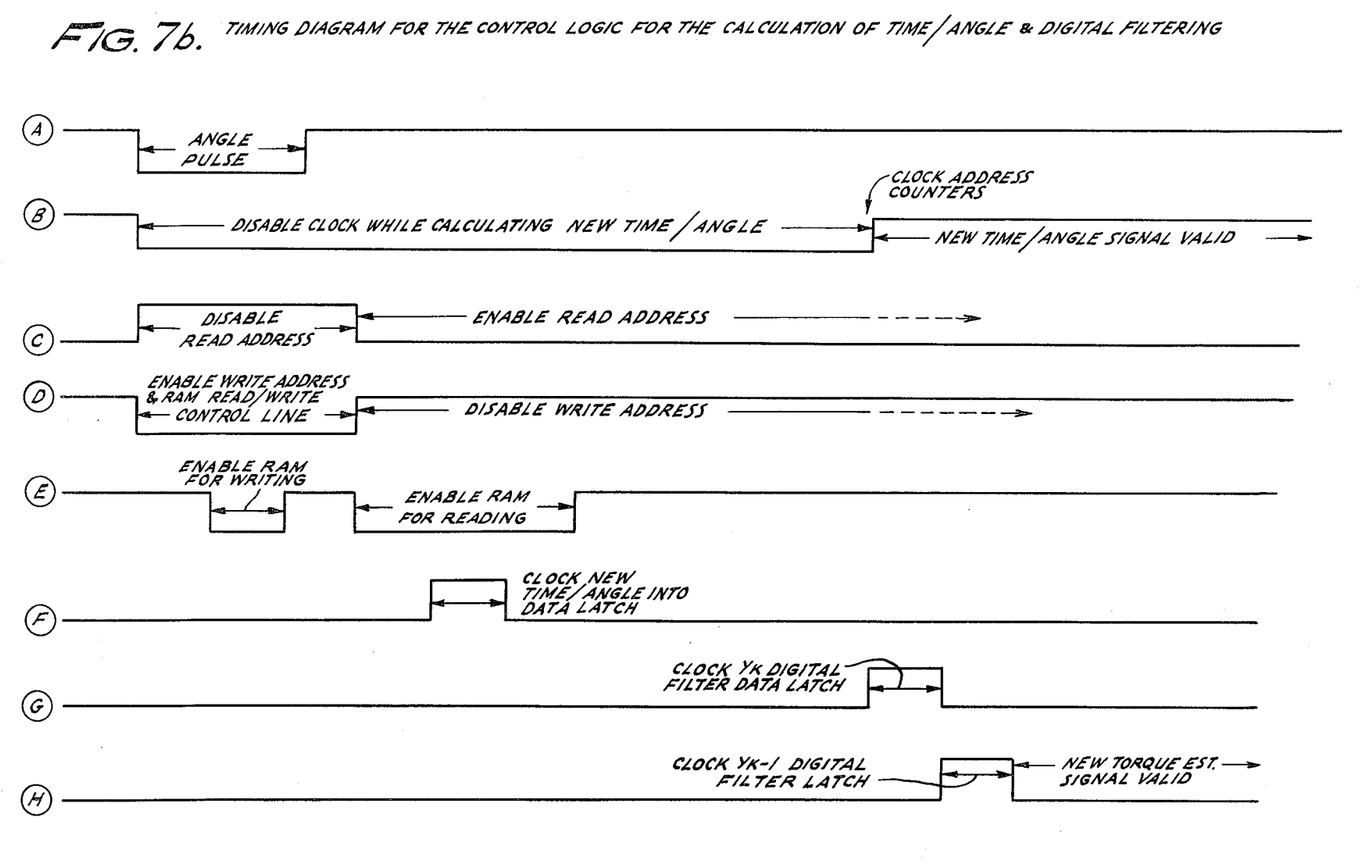
FIG. 7b is an illustration of the waveforms produced by the blocks of FIG. 7.

The processing sequence for calculation of time/angle, which is started with an angle pulse from circuit 66, is as follows with reference to FIGS. 7a and 7b:

(a) Multivibrator 116 is inhibited by signal B from circuit 138 so that the value of time cannot change during processing;

(b) RAM 117 is put in the write mode by Signal D from circuit 138 and write address counter 120 is also enabled by signal D;

(c) The current value of time is written in the RAM memory location addressed by write address counter 120 by signal E from circuit 138;

(d) RAM 117 is put in the read mode by signal D from circuit 138, the write address is disabled, and the read address is enabled by enabling the output of read address counter 122 by signal C, and RAM 117 is enabled for reading by signal E;

(e) At that point in time the difference between the current time and the time stored "N" angle increments previously is then valid at the output of subtraction circuit 118. This time/angle signal is then stored by clocking a data latch 142 connected to the output of subtraction circuit 118 by means of signal F from circuit 138. Data latch 142 is used for storing binary data and typically consists of three 4-bit latches for 12-bit resolution, such as, for example, National Semiconductor part No. 74175.

(f) Multivibrator 116 is then enabled by driving signal B from circuit 138 high, write and read address counters 120 and 122 are incremented ready for the next angle pulse from circuit 66, and the leading edge of signal B indicates that a new time/angle signal is now valid at the output of data latch 142.

Figure 7C:
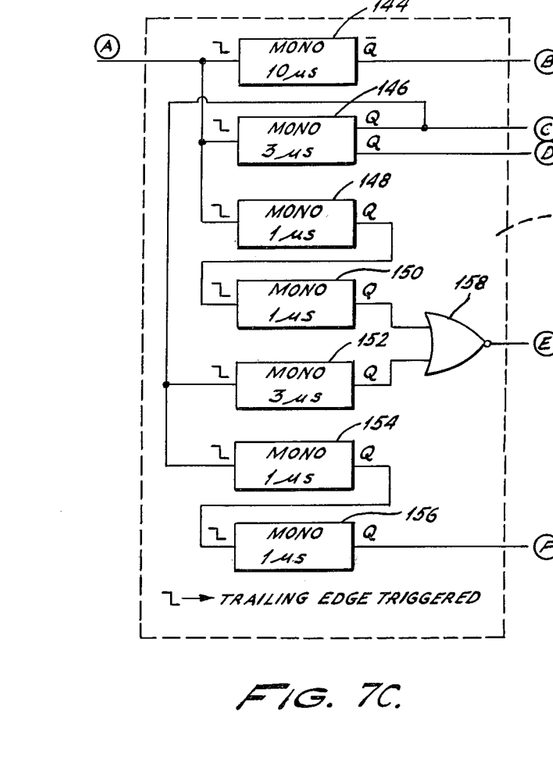
FIG. 7c is a schematic illustration of the Timing Control Logic block shown in FIG. 7.

Timing control logic circuit 138 will now be described in greater detail with reference to FIG. 7c. Circuit 138 generates the timing control signals B-F previously referred to for calculation of time/angle following an angle pulse from circuit 66, as shown in FIG. 7b. These signals are typically produced by a plurality of monostable multivibrators 144, 146, 148, 150, 152, 154 and 156, such as, for example, National Semiconductor part No. 74123. The respective time constants (e.g. 10 μs, 3 μs, 1 μs) of these multivibrators are chosen for the desired timing sequences, and are built in by external RC circuits to the desired values. Each of the multivibrators are designed to trigger on the trailing edge of an incoming signal, as illustrated by the symbol Z at the input of each multivibrator. Angle signal A is introduced into inputs to multivibrators 144, 146 and 148. Output signal B is generated by multivibrator 144, and output signals C and D are both generated by multivibrator. Output signal C from multivibrator 146 is introduces into multivibrators 152 and 154. The output from multivibrator 148 is introduced into the input to multivibrator 150, and the respective outputs from multivibrators 150 and 152 are fed into a NOR gate 158, whose output is signal E. The output from multivibrator 154 is introduced into the input to multivibrator 156, whose output is signal F.

Since the impact tightening process is discontinuous, the time/angle signals generated by circuit 68 produce a curve illustrated in FIG. 8 having a great deal of noise. A filtering or averaging process is thus required to make use of this time/angle information. Such processes inevitably introduce delays in real time systems. Filtering in the time domain is unsatisfactory because the rate of tightening varies considerably during the tightening process and therefore so does the amount of necessary filtering or "smoothing" of the curve of FIG. 8. This problem is eliminated by digital filtering in the angle domain. Not only does this technique ensure consistent filtering, but also, since the range of tightening angles for most fasteners is between 90° and 180°, the filter constant does not require alteration for different joints. It need only be altered to compensate for changes in angle encoder resolution.

Referring again to FIG. 7, digital filter circuit 72, shown in FIG. 5, will now be described in greater detail. The digital filter used to filter the time/angle signal from circuit 68 in order to produce a torque estimate signal usable in yield detection circuit 70, is a first order low pass recursive filter defined by the filter difference equation, $$Y_k = aX_k + bY_{k-1}$$

where,
 $Y_k$ = the present filter output
 $X_k$ = the present filter input
 $Y_{k-1}$ = the previous filter output For a 5° resolution encoder, for example, the constants "a" and "b" are chosen as ¼ and ¾, respectively, and the difference equation is, $$Y_k = \tfrac{1}{4}X_k + \tfrac{3}{4}Y_{k-1}$$

or, $$Y_k = Y_{k-1} + (X_k - Y_{k-1})/4$$

The filter described by this equation is illustrated in FIG. 7 as follows. $Y_k$ and $Y_{k-1}$ are respectively stored in data latches 160 and 162, which are similar to data latch 142. The output signal, $Y_{k-1}$, from data latch 162 is introduced along with the time/angle signal, $X_k$, from data latch 142 in circuit 68, into a subtraction circuit 164, whose output is the difference signal $(X_k - Y_{k-1})$. Division by 4 is accomplished by shifting the binary data lines 2-bits to the right by a hard-wired shift designated as 166. This is accomplished, for example, by connecting each output data line from subtraction circuit 164 to a corresponding input data line two significant bits lower on addition circuit 168. That is, the output binary data line representing the decimal value "8" on circuit 164 is connected to the input binary data line representing the decimal value "2" on circuit 168, and correspondingly, "4" on circuit 164 is connected to "1" on circuit 168. The output signal, $Y_{k-1}$, from data latch 162 is added to the output signal, $(X_k - Y_{k-1})/4$, from shift register 166 in an addition circuit 168. Subtraction and addition circuits 164 and 168 typically comprise three binary full adders for 12-bit resolution, similar to subtraction circuit 118. Data latches 160 and 162 are clocked by monostable multivibrators or one-shots 170 and 172, respectively, which output signals G and H illustrated in FIG. 7b. Multivibrators 170 and 172, such as, for example, National Semiconductor part No. 74123, are triggered respectively from the leading edge of signal B representing the new time/angle signal valid line, and the trailing edge of the output signal from multivibrator 170. The trailing edge of the signal from multivibrator 172 indicates that a new torque estimate has been calculated following an angle pulse. The output, $Y_k$, from data latch 160 of digital filter 72 is the torque estimate which is introduced along with the incremental angle pulses from circuit 66 into yield detection circuit 70.

Figure 9:
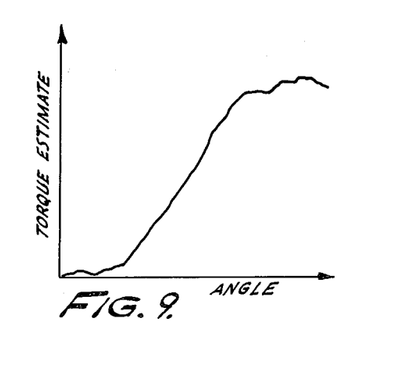
FIG. 9 is a graph of TORQUE ESTIMATE vs. ANGLE from the Digital Filter block of FIGS. 5 and 7 after digital filtering in the angle domain.

Yield detection circuit 70 may be any of a number of systems for tightening to the yield point of the fastener assembly, such as, for example, the systems described in U.S. Pat. Nos. 3,974,883, 4,023,406, 4,027,530, 4,104,779, 4,104,780 and others. However, a preferred system is that disclosed in U.S. Pat. No. 3,982,419, particularly FIG. 7 thereof. The disclosure of this patent is incorporated herein by reference as fully as if it were described in detail. Briefly describing the function of yield detection, circuit 70, the gradient of slope of the Torque Estimate vs. Angle curve illustrated in FIG. 9 is determined, and the characteristic (e.g. maximum) slope in the tightening (e.g. linear) region of the curve is stored. The instantaneous gradient signal is then compared with the stored gradient signal, and a control signal is provided to solenoid trip valve assembly 58 indicating that the yield point has been reached when the instantaneous gradient signal is a predetermined percentage of the stored gradient signal. The solenoid trip valve assembly then operates to cut off the flow of air to the air motor discontinuing tightening of the fastener assembly.

Figures 1, 2:
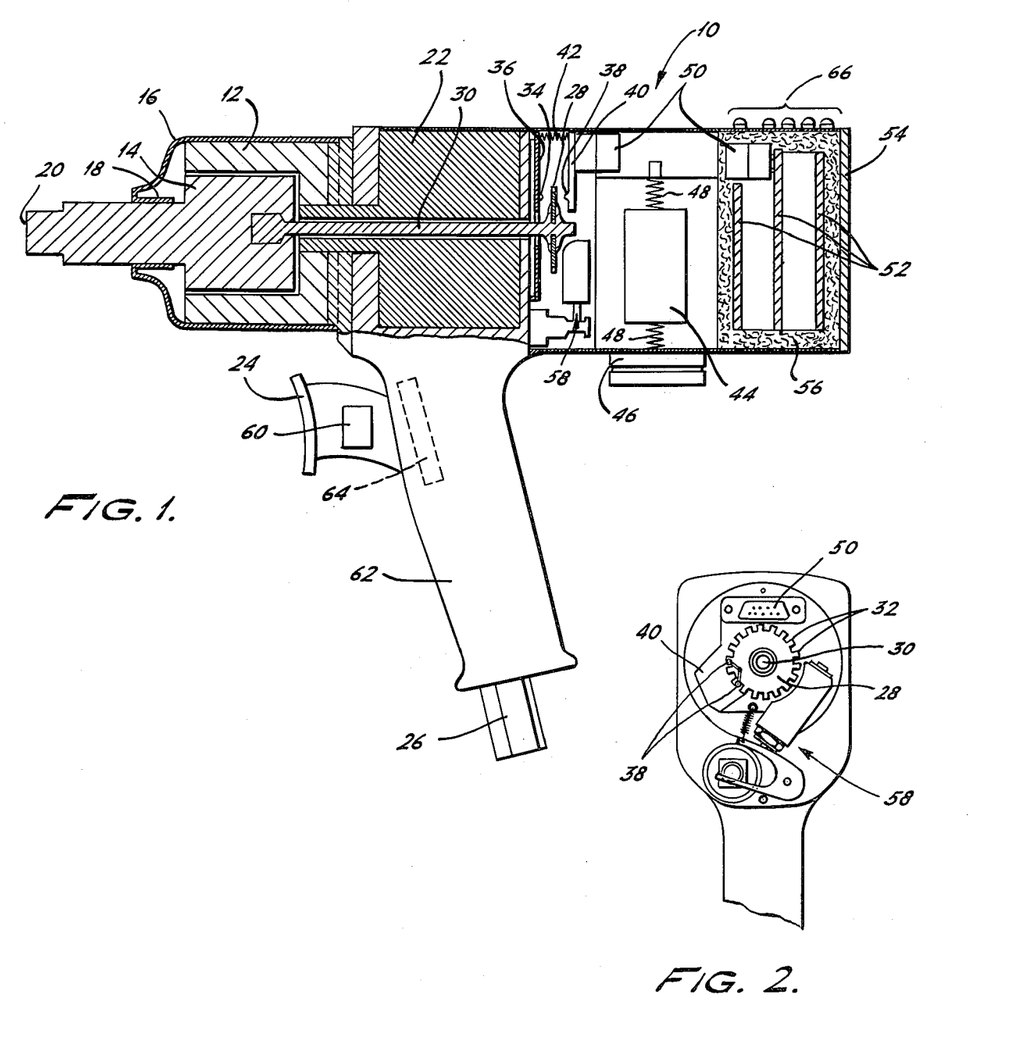
FIG. 1 is a side elevational view of an impact wrench constructed according to the invention partially cut away and in cross-section, showing the entire wrench control system.
FIG. 2 is an elevational view of the rear portion of the wrench of FIG. 1 with the back cover removed.
Figure 3:
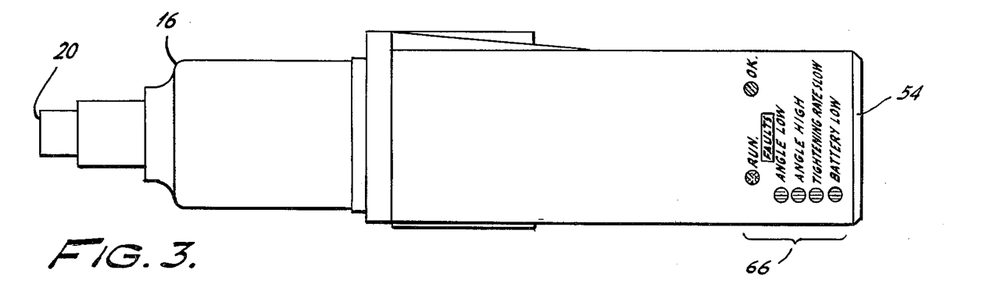
FIG. 3 is a top view of the wrench shown in FIG. 1.

While the control system has been described with reference to integrated circuit logic elements, it is to be understood that the functions of circuits 68, 70 and 72 could be accomplished by an appropriately programmed microprocessor, such as, for example, an Intel Model No. 8748, or other similar microprocessors. The results obtained with a programmed microprocessor version of the control system are fully equivalent to those obtained with the control system previously described. An impact wrench using a programmed Intel Model No. 8748 microprocessor has been built, as illustrated in FIGS. 1 and 3, and successfully tested.

Having thus described the impact wrench and control circuitry, operation of the wrench will now be described with reference to the drawings. Upon depression of trigger mechanism 24, reed switch 64 is closed by magnet 60 providing power to the electronic control system. The "RUN" LED immediately indicates that the control system is operating. If the battery is low, a red BATTERY LOW LED is energized instead, indicating that the battery requires recharging. Depression of the trigger also opens the valve (not shown) admitting air from inlet port 26 through air valve 302 to the air motor driving rotor 22 and initiating the tightening sequence. When tightening is complete, a signal from the control system actuates solenoid trip valve assembly 58 which shuts off the air supply to the air motor. A number of checks are carried out on the torque estimate/angle data during the tightening sequence. If the tightening is within specifications, the "OK" LED is turned on and remains on until the system is deenergized by releasing the wrench trigger mechanism 24 and opening reed switch 64. If the tightening is not within specifications, a number of fault LED's indicate the specific fault condition. These include ANGLE LOW, ANGLE HIGH and TIGHTENIING RATE SLOW LED's. If any of these fault LED's should light, the operator would then check the joint just tightened to see if there are any problems, or the wrench for possible malfunction.

While in the foregoing there have been disclosed alternate embodiments of a tightening system in accordance with the present invention, it should be readily apparent that various changes and modifications could be made by one skilled in the art without departing from the true spirit and scope of the invention as recited in the claims.

We claim:

1. Apparatus for providing a parameter representative of torque in a tightening system having a pulsed output for periodically applying a tightening moment to a member, said parameter being derived from forward rotation angle measurement of the member being tightened.

2. Apparatus in accordance with claim 1 wherein said parameter representative of torque is derived from a measurement of time over a fixed interval of forward rotation angle of the member being tightened.

3. Apparatus in accordance with claim 1 wherein said parameter representative of torque is derived from a measurement of forward rotation angle of the member being tightened over a fixed interval of time.

4. Apparatus in accordance with claim 1 wherein said parameter representative of torque is derived from a measurement of forward rotation angle of the member being tightened per impact of the tightening system.

5. Apparatus in accordance with claim 1 wherein said parameter representative of torque is derived from a measurement of impacts over a fixed interval of forward rotation angle of the member being tightened.

6. Apparatus in accordance with claim 1 or 2 including means for determining the forward rotation angle of the member being tightened and providing a signal indicative thereof and means for calculating the time over a fixed interval of said forward rotation angle and providing a signal indicative thereof.

7. Apparatus in accordance with claim 6 further including means receiving said forward rotation angle signal and said signal indicative of time over a fixed interval of said forward rotation angle for developing a control signal when the member has been tightened to its yield point or some similarly significant point.

8. Apparatus in accordance with claim 6 further including filtering means receiving said signal indicative of time over a fixed interval of said forward rotation angle for providing a filtered signal thereof.

9. Apparatus for providing a parameter representative of torque in a tightening system having a pulsed output for periodically applying a tightening moment to a member, said parameter being derived from forward rotation angle measurement of the member being tightened, including means for determining the forward rotation angle of the member being tightened and providing a signal indicative thereof, means for calculating the time over a fixed interval of said forward rotation angle and providing a signal indicative thereof, and a digital filter means receiving said signal indicative of time over a fixed interval of said forward rotation angle for providing a filtered signal thereof.

10. Apparatus in accordance with claim 9 wherein said digital filter filters in the angle domain.

11. Apparatus in accordance with claim 9 or 10 further including means receiving said forward rotation angle signal and said filtered signal for developing a control signal when the member has been tightened to its yield point or some similarly significant point.

12. Apparatus in accordance with claim 11 including means adapted to receive said control signal for discontinuing tightening of the member.

13. Apparatus for tightening a joint assembly including a fastener, to a predetermined tightened condition said apparatus comprising:

wrench means having a pulsed output for periodically applying a tightening moment to the fastener;

first means for determining the forward rotation angle of the fastener being tightened and producing an output signal indicative thereof;

second means receiving said first means output signal for providing an output signal representative of time over a fixed interval of said forward rotation angle; and third means receiving said first and second means output signals for developing a control signal when the predetermined tightened condition is reached.

14. Apparatus in accordance with claim 13 further including filter means interposed between said second and third means receiving said second means output signal for filtering spurious noise from said signal and outputting a filtered signal to said third means for use in developing said control signal when the predetermined tightened condition is reached.

15. Apparatus in accordance with claim 13 or 14 wherein said predetermined tightened condition is the yield point or some similarly significant point of the joint assembly being tightened.

16. Apparatus in accordance with claim 15 wherein said control signal is developed by developing a signal representative of the instantaneous gradient of a curve which could be plotted for said first and second output signals through which the joint assembly is being tightened, and determining a significant change in slope following a tightening region on said curve by storing a signal representative of the gradient of said curve in the tightening region thereof and developing said control signal when said instantaneous signal is a predetermined percentage of said stored signal.

17. Apparatus in accordance with claim 15 wherein said control signal is developed by developing a signal representative of the instantaneous gradient of a curve which could be plotted for said first means and said filter means output signals through which the joint assembly is being tightened, and determining a significant change in slope following a tightening region on said curve by storing a signal representative of the gradient of said curve in the tightening region thereof and developing said control signal when said instantaneous signal is a predetermined percentage of said stored signal.

18. Apparatus in accordance with claim 16 wherein said stored signal is representative of the maximum gradient of the curve of said first and second means output signals.

19. Apparatus in accordance with claim 17 wherein said stored signal is representative of the maximum gradient of the curve of said first means and said filter means output signals.

20. Apparatus in accordance with claim 13 or 14 wherein said first means includes encoder means, sensor means and circuit means for producing said signal indicative of forward rotation angle of the fastener being tightened.

21. Apparatus in accordance with claim 13 wherein said second and third means comprise programmed microprocessor means.

22. Apparatus for tightening a joint assembly including a fastener, to a predetermined tightened condition said apparatus comprising:
  wrench means having a pulsed output for periodically applying a tightening moment to the fastener;
  first means for determining the forward rotation angle of the fastener being tightened and producing an output signal indicative thereof;
  second means receiving said first means output signal for providing an output signal representative of time over a fixed interval of said forward rotation angle;
  third means receiving said first and second means output signals for developing a control signal when the predetermined tightened condition is reached; and
  filter means interposed between said second and third means receiving said second means output signal for filtering spurious noise from said signal and outputting a filtered signal to said third means for use in developing said control signal when the predetermined tightened condition is reached;
and wherein said second, third and filter means comprise programmed microprocessor means.

23. Apparatus in accordance with claim 13 or 14 wherein said third means control signal is operative to discontinue the application of the tightening moment.

24. Apparatus in accordance with claim 23 further including shutoff means and wherein said third means control signal is introduced to said shutoff means to discontinue the application of the tightening moment.

25. Apparatus in accordance with claim 24 wherein said wrench means is fluid operated and wherein said shutoff means includes actuating means, lever means and valve means, said actuating means receiving said third means control signal and displacing said lever means, which is initially biased into engagement with said valve means in an open position, out of engagement with said valve means causing said valve means to move to a closed position stopping the flow of fluid to said wrench means.

26. Apparatus in accordance with claim 25 wherein said actuating means is a solenoid actuating device.

27. Apparatus in accordance with claim 25 wherein said lever means is pivotable out of and into engagement with said valve means.

28. In an impact wrench including a hammer impacting with an anvil to rotate an output shaft operative to tighten as assembly including a fastener to its yield point by applying a tightening moment thereto, a control system comprising:
  first means for determining the forward rotation angle of the fastener being tightened and producing an output signal indicative thereof;
  second means receiving said first means output signal for providing a signal representative of time over a fixed interval of said forward rotation angle; and
  third means receiving said first and second means output signals for developing a control signal when the predetermined tightened condition is reached.

29. A control system in accordance with claim 28 further including filter means interposed between said second and third means receiving said second means output signal for filtering spurious noise from said signal and outputting a filtered signal to said third means for use in developing said control signal when the predetermined tightened condition is reached.

30. A control system in accordance with claim 28 or 29 wherein said predetermined tightened condition is the yield point or some similarly significant point of the assembly being tightened.

31. A control system in accordance with claim 30 wherein said control signal is developed by developing a signal representative of the instantaneous gradient of a curve which could be plotted for said first and second means output signals through which the joint assembly is being tightened, and determining a significant change in slope following a tightening region on said curve by storing a signal representative of the gradient of said curve in the tightening region thereof and developing said control signal when said instantaneous signal is a predetermined percentage of said stored signal.

32. A control system in accordance with claim 30 wherein said control signal is developed by developing a signal representative of the instantaneous gradient of a curve which could be plotted for said first means and said filter means output signals through which the joint assembly is being tightened, and determining a significant change in slope following a tightening region on said curve by storing a signal representative of the gradient of said curve in the tightening region thereof and developing said control signal when said instantaneous signal is a predetermined percentage of said stored signal.

33. A control system in accordance with claim 31 wherein said stored signal is representative of the maximum gradient of the curve of said first and second means output signals.

34. A control system in accordance with claim 32 wherein said stored signal is representative of the maximum gradient of the curve of said first means and said filter means output signals.

35. A control system in accordance with claim 28 or 29 wherein said first means includes encoder means, sensor means and circuit means for producing said signal indicative of forward rotation angle of the fastener being tightened.

36. A control system in accordance with claim 28 wherein said second and third means comprise programmed microprocessor means.

37. In an impact wrench including a hammer impacting with an anvil to rotate an output shaft operative to tighten an assembly including a fastener to its yield point by applying a tightening moment thereto, a control system comprising:
  first means for determining the forward rotation angle of the fastener being tightened and producing an output signal indicative thereof;
  second means receiving said first means output signal for providing a signal representative of time over a fixed interval of said forward rotation angle;
  third means receiving said first and second means output signals for developing a control signal when the predetermined tightened condition is reached; and filter means interposed between said second and third means receiving said second means output signal for filtering spurious noise from said signal and outputting a filtered signal to said third means for use in developing said control signal when the predetermined tightened condition is reached;

and wherein said second, third and filter means comprise programmed microprocessor means.

38. A control system in accordance with claim 28 or 29 wherein said third means control signal is operative to discontinue the application of the tightening moment.

39. A control system in accordance with claim 38 wherein said impact wrench further includes shutoff means and wherein said third means control signal is introduced to said shutoff means to discontinue the application of the tightening moment.

40. A control system in accordance with claim 39 wherein said impact wrench is fluid operated and wherein said shutoff means includes actuating means, lever means and valve means, said actuating means receiving said third means control signal and displacing said lever means, which is initially biased into engagement with said valve means in an open position, out of engagement with said valve means causing said valve means to move to a closed position stopping the flow of fluid to said impact wrench.

41. A control system in accordance with claim 40 wherein said actuating means is a solenoid actuating device.

42. A control system in accordance with claim 40 wherein said lever means is pivotable out of and into engagement with said valve means.

43. An impact wrench for tightening an assembly including a fastener comprising:
a motor;
a hammer assembly adapted to be driven by said motor;
an anvil adapted to be rotatingly impacted by said hammer assembly;
wrenching means operatively attached to said anvil and adapted to drive the fastener by applying torque thereto;
first means for determining the forward rotation angle of the fastener being tightened and producing an output signal indicative thereof;
second means receiving said first means output signal for providing a signal representative of time over a fixed interval of said forward rotation angle; and
third means receiving said first and second means output signals for developing a control signal when the predetermined tightened condition is reached.

44. An impact wrench in accordance with claim 43 further including filter means interposed between said second and third means receiving said second means output signal for filtering spurious noise from said signal and outputting a filtered signal to said third means for use in developing said control signal when the predetermined tightened condition is reached.

45. An impact wrench in accordance with claim 43 or 44 wherein said predetermined tightened condition is the yield point or some similarly significant point of the assembly being tightened.

46. An impact wrench in accordance with claim 45 wherein said control signal is developed by developing a signal representative of the instantaneous gradient of a curve which could be plotted for said first and second means output signals through which the joint assembly is being tightened, and determining a significant change in slope following a tightening region on said curve by storing a signal representative of the gradient of said curve in the tightening region thereof and developing said control signal when said instantaneous signal is a predetermined percentage of said stored signal.

47. An impact wrench in accordance with claim 45 wherein said control signal is developed by developing a signal representative of the instantaneous gradient of a curve which could be plotted for said first means and said filter means output signals through which the joint assembly is being tightened, and determining a significant change in slope following a tightening region on said curve by storing a signal representative of the gradient of said curve in the tightening region thereof and developing said control signal when said instantaneous signal is a predetermined percentage of said stored signal.

48. An impact wrench in accordance with claim 46 wherein said stored signal is representative of the maximum gradient of the curve of said first and second means output signals.

49. An impact wrench in accordance with claim 47 wherein said stored signal is representative of the maximum gradient of the curve of said first means and said filter means output signals.

50. An impact wrench in accordance with claim 43 or 44 wherein said first means includes encoder means, sensor means and circuit means for producing said signal indicative of forward rotation angle of the fastener being tightened.

51. An impact wrench in accordance with claim 43 wherein said second and third means comprise programmed microprocessor means.

52. An impact wrench for tightening an assembly including a fastener comprising:
a motor;
a hammer assembly adapted to be driven by said motor;
an anvil adapted to be rotatingly impacted by said hammer assembly;
wrenching means operatively attached to said anvil and adapted to drive the fastener by applying torque thereto;
first means for determining the forward rotation angle of the fastener being tightened and producing an output signal indicative thereof;
second means receiving said first means output signal for providing a signal representative of time over a fixed interval of said forward rotation angle;
third means receiving said first and second means output signals for developing a control signal when the predetermined tightened condition is reached; and
filter means interposed between said second and third means receiving said second means output signal for filtering spurious noise from said signal and outputting a filtered signal to said third means for use in developing said control signal when the predetermined tightened condition is reached,
and wherein said second, third and filter means comprise programmed microprocessor means.

53. An impact wrench in accordance with claim 43 or 44 wherein said third means control signal is operative to discontinue the application of the tightening moment.

54. An impact wrench in accordance with claim 53 further including shutoff means and wherein said third means control signal is introduced to said shutoff means to discontinue the application of the tightening moment.

55. An impact wrench in accordance with claim 54 wherein said impact wrench is fluid operated and wherein said shutoff means includes actuating means, lever means and valve means, said actuating means receiving said third means control signal and displacing said lever means, which is initially biased into engagement with said valve means in an open position, out of engagement with said valve means causing said valve means to move to a closed position stopping the flow of fluid to said impact wrench.

56. An impact wrench in accordance with claim 55 wherein said actuating means is a solenoid actuating device.

57. An impact wrench in accordance with claim 55 wherein said lever means is pivotable out of and into engagement with said valve means.

58. A method of tightening an assembly including a fastener to a predetermined tightened condition by periodically applying a tightening moment to the fastener with wrench means having a pulsed output, comprising the steps of:
   determining the forward rotation angle of the fastener being tightened and producing a first output signal indicative thereof;
   providing from said first output signal a second output signal representative of time over a fixed interval of said forward rotation angle; and
   developing from saif first and second output signals a control signal when the predetermined tightened condition is reached.

59. A method of tightening an assembly in accordance with claim 58 further comprising the step of filtering said second output signal to remove spurious noise therefrom and thereafter developing from said first output signal and said filtered second output signal said control signal when the predetermined tightened condition is reached.

60. A method of tightening an assembly in accordance with claim 58 or 59 wherein the predetermined tightened condition is the yield point or some similarly significant point of the assembly being tightened.

61. A method of tightening an assembly in accordance with claim 60 wherein said control signal is developed by developing a signal representative of the instantaneous gradient of a curve which could be plotted for said first and second means output signals through which the assembly is being tightened, and determining a significant change in slope following a tightening region on said curve by storing a signal representative of the gradient of said curve in the tightening region thereof and developing said control signal when said instantaneous signal is a predetermined percentage of said stored signal.

62. A method of tightening an assembly in accordance with claim 60 wherein said control signal is developed by developing a signal representative of the instantaneous gradient of a curve which could be plotted for said first means and said filter means output signals through which the assembly is being tightened, and determining a significant change in slope following a tightening region on said curve by storing a signal representative of the gradient of said curve in the tightening region thereof and developing said control signal when said instantaneous signal is a predetermined percentage of said stored signal.

63. A method of tightening an assembly in accordance with claim 61 wherein said stored signal is representative of the maximum gradient of the curve of said first and second means output signals.

64. A method of tightening an assembly in accordance with claim 62 wherein said stored signal is representative of the maximum gradient of the curve of said first means and said filter means output signals.

65. A method of tightening an assembly in accordance with claim 58 wherein the steps of providing said second output signal and developing said control signal are accomplished by programmed microprocessor means.

66. A method of tightening an assembly including a fastener to a predetermined tightened condition by periodically applying a tightening moment to the fastener with wrench means having a pulsed output, comprising the steps of:
   determining the forward rotation angle of the fastener being tightened and producing a first output signal indicative thereof;
   providing from said first output signal a second output signal representative of time over a fixed interval of said forward rotation angle;
   filtering said second output signal to remove spurious noise therefrom; and
   developing from said first output signal and said filtered second output signal said control signal when the predetermined tightened condition is reached; and wherein the steps of providing said second output signal, filtering said second output signal to remove spurious noise therefrom and developing said control signal are accomplished by programmed microprocessor means.

67. A method of tightening an assembly in accordance with claim 58 or 59 wherein said control signal is operative to discontinue the application of the tightening moment.

68. Apparatus for tightening a joint assembly including a fastener, to a predetermined tightened condition said apparatus comprising:
   wrench means having a pulsed output for periodically applying a tigthened moment to the fastener;
   first means for determining the forward rotation angle of the fastener being tightened and producing an output signal indicative thereof;
   second means receiving said first means output signal for providing an output signal representative of time over a fixed interval of said forward rotation angle;
   third means receiving said first and second means output signals for developing a control signal when the predetermined tightened condition is reached; and
   a digital filter means interposed between said second and third means receiving said second means output signal for filtering spurious noise from said signal and outputting a filtered signal to said third means for use in developing said control signal when the predetermined tightened condition is reached.

69. Apparatus in accordance with claim 68 wherein said digital filter filters in the angle domain.

70. In an impact wrench including a hammer impacting with an anvil to rotate an output shaft operative to tighten an assembly including a fastener to its yield point by applying a tightening moment thereto, a control system comprising:

first means for determining the forward rotation angle of the fastener being tightened and producing an output signal indicative thereof;

second means receiving said first means output signal for providing a signal representative of time over a fixed interval of said forward rotation angle;

third means receiving said first and second means output signals for developing a control signal when the predetermined tightened condition is reached; and a digital filter means interposed between said second and third means receiving said second means output signal for filtering spurious noise from said signal and outputting a filtered signal to said third means for use in developing said control signal when the predetermined tightened condition is reached.

71. Apparatus in accordance with claim 70 wherein said digital filter filters in the angle domain.

72. An impact wrench for tightening an assembly including a fastener comprising:

a motor;

a hammer assembly adapted to be driven by said motor;

an anvil adapted to be rotatingly impacted by said hammer assembly;

wrenching means operatively attached to said anvil and adapted to drive the fastener by applying torque thereto;

first means for determining the forward rotation angle of the fastener being tightened and producing an output signal indicative thereof;

second means receiving said first means output signal for providing a signal representative of time over a fixed interval of said forward rotation angle;

third means receiving said first and second means output signals for developing a control signal when the predetermined tightened condition is reached; and a digital filter means interposed between said second and third means receiving said second means output signal for filtering spurious noise from said signal and outputting a filtered signal to said third means for use in developing said control signal when the predetermined tightened condition is reached.

73. Apparatus in accordance with claim 72 wherein said digital filter filters in the angle domain.

74. A method of tightening an assembly including a fastener to a predetermined tightened condition by periodically applying a tightening moment to the fastener with wrench means having a pulsed output, comprising the steps of:

determining the forward rotation angle of the fastener being tightened and producing a first output signal indicative thereof;

providing from said first output signal a second output signal representative of time over a fixed interval of said forward rotation angle; and digitally filtering said second output signal to remove spurious noise therefrom; and developing from said first output signal and said digitally filtered second output signal said control signal when the predetermined tightened condition is reached.

75. A method of tightening an assembly in accordance with claim 74 wherein said digital filtering is performed in the angle domain.

76. Apparatus in accordance with claim 8 further including means receiving said forward rotation angle signal and said filtered signal for developing a control signal when the member has been tightened to its yield point or some similarly significant point.

77. Apparatus in accordance with claim 7 including means adapted to receive said control signal for discontinuing tightening of the member.

* * * * *